Nov. 12, 1946.    T. J. BELL    2,410,860
CELERY CUTTER
Filed March 3, 1944    4 Sheets-Sheet 1
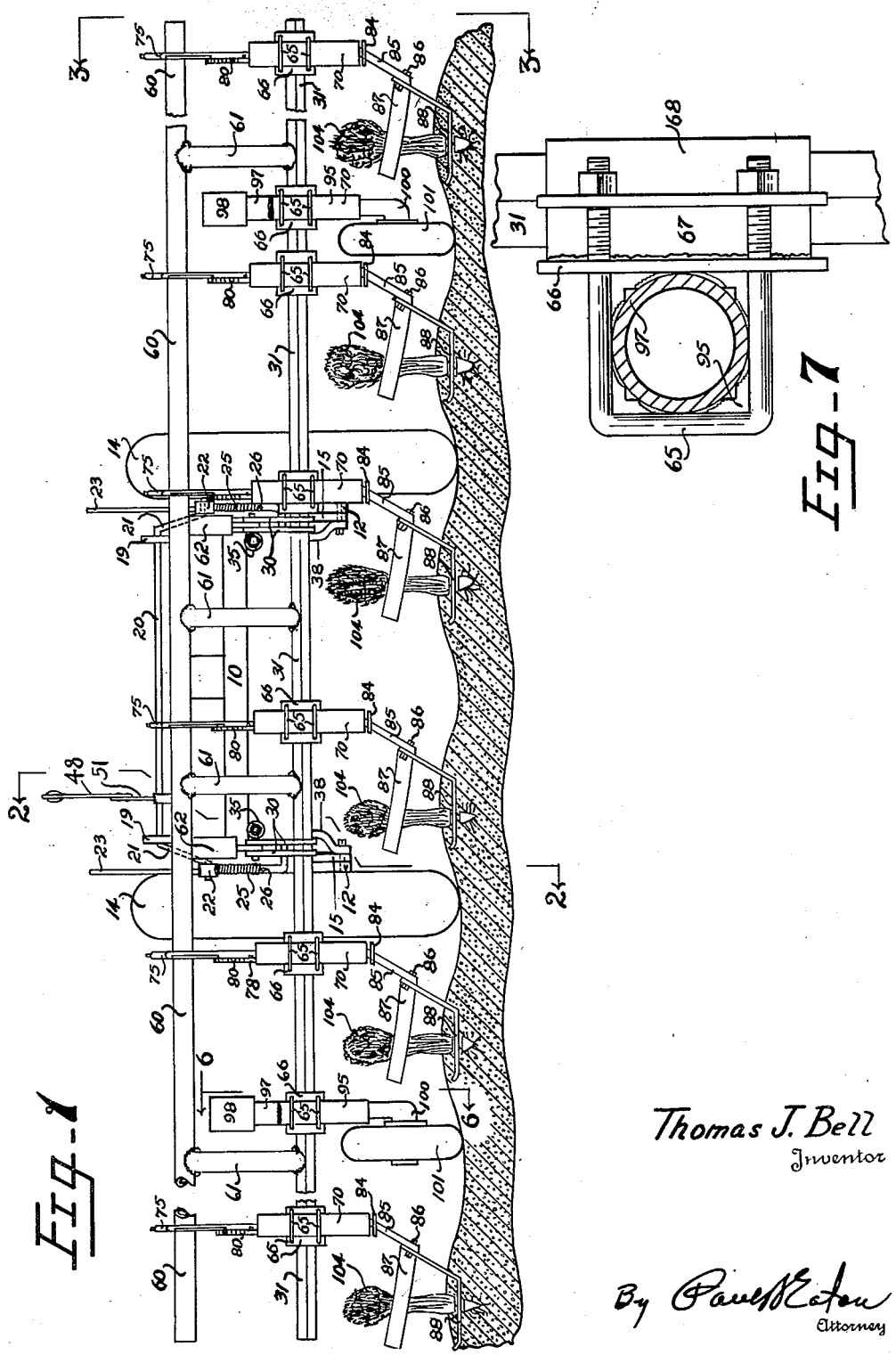
Thomas J. Bell
Inventor
By Paul S. Eaton
Attorney

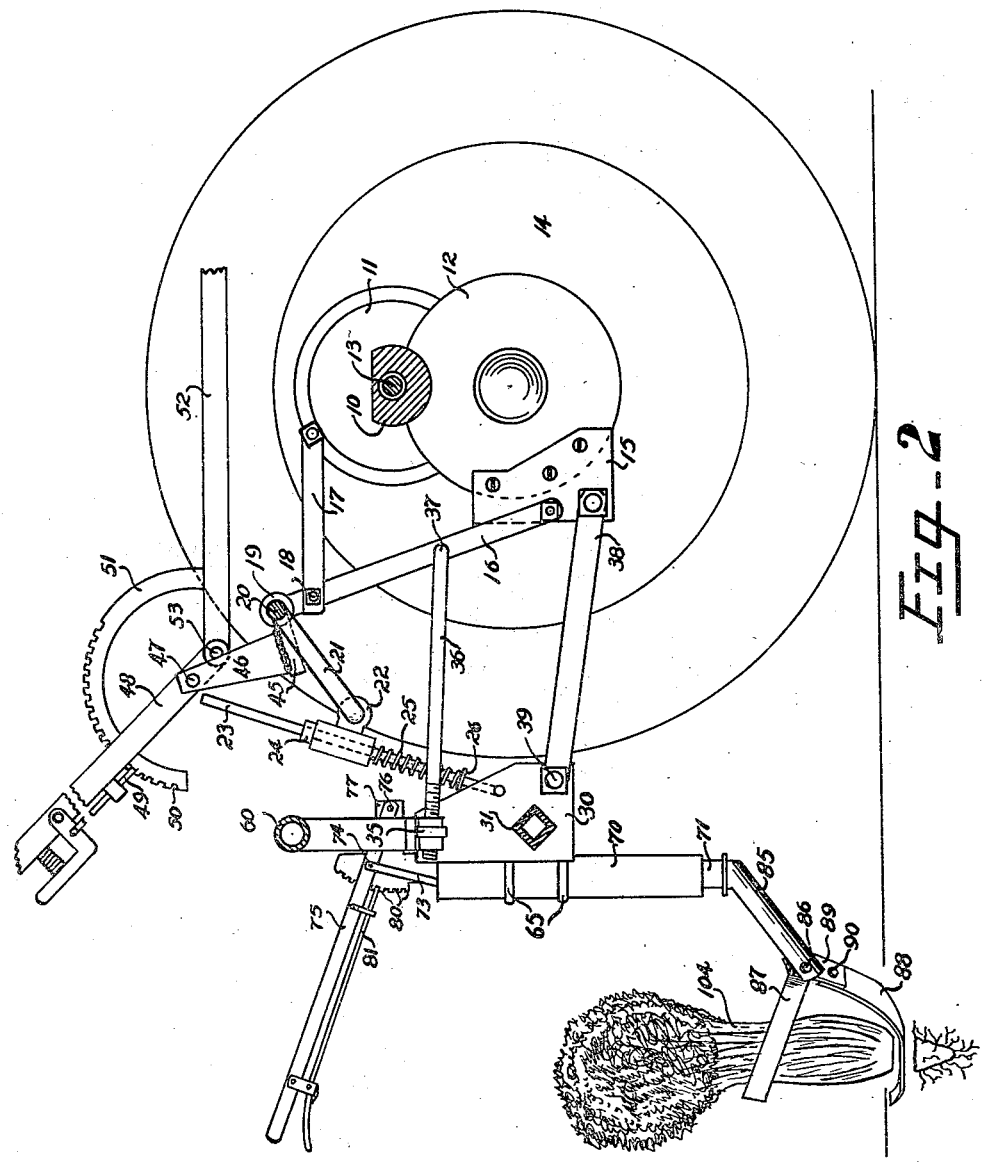

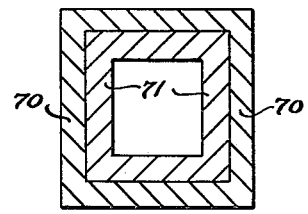
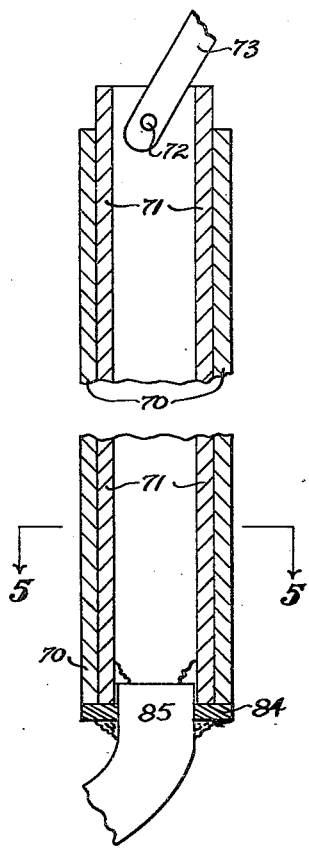
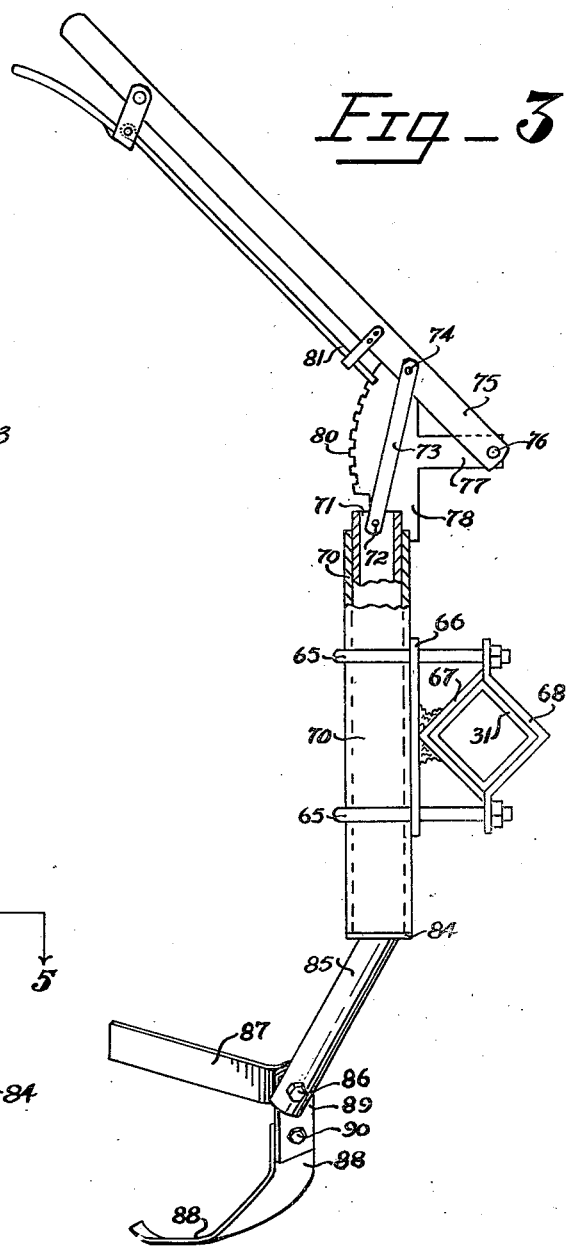

Nov. 12, 1946.   T. J. BELL   2,410,860
CELERY CUTTER
Filed March 8, 1944   4 Sheets-Sheet 4
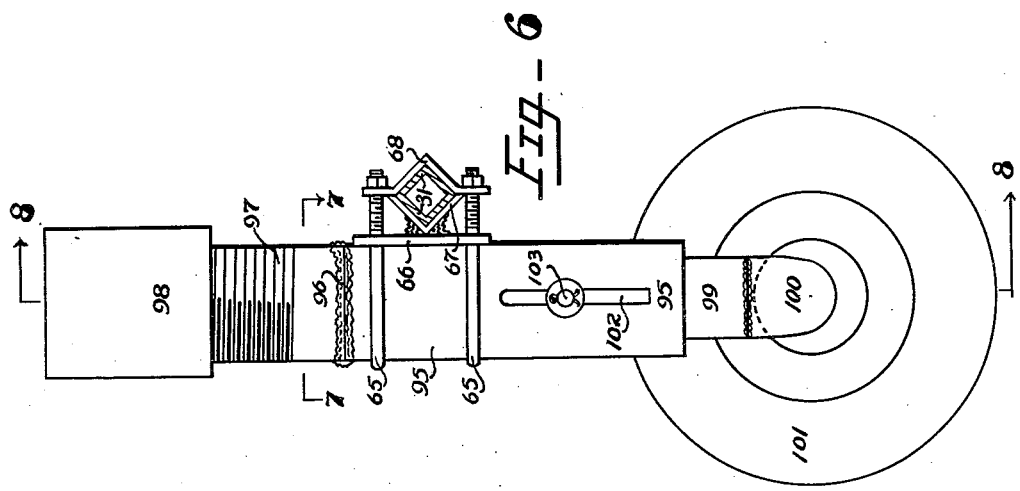
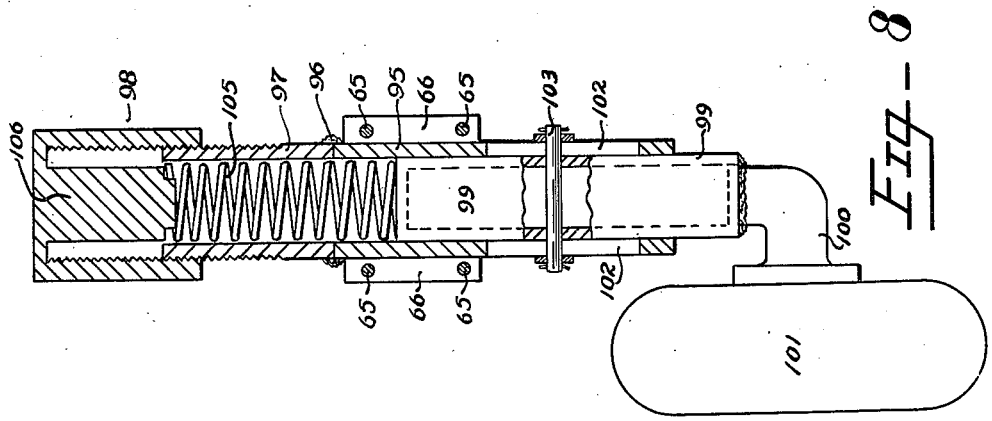
Thomas J. Bell
Inventor Patented Nov. 12, 1946

2,410,860

UNITED STATES PATENT OFFICE 2,410,860

CELERY CUTTER

Thomas J. Bell, Sarasota, Fla.

Application March 8, 1944, Serial No. 525,481

5 Claims. (Cl. 55—60)

This invention relates to a celery cutting machine, and more especially to a boom pivotally secured to the rear end of a tractor and having thereon a plurality of vertically adjustable cutters with means whereby the hydraulic mechanism of the tractor is adapted to lift the boom and the cutters for transporting from place to place and is also adapted to lower the cutters to a predetermined position for a cutting operation with each individual cutter having individual adjusting means to suit the contour conditions of the land and whereby a plurality of rows of celery can be cut simultaneously.

In celery growing, the rows are laid off a definite distance apart and are perfectly straight so as to facilitate cultivating and spraying operations. These rows are usually, in order to adapt themselves to spray boom, and cutting operations, laid off usually with four rows thirty inches apart with the fifth row being about thirty-two inches from the fourth row and the sixth row about thirty-eight inches from the fifth row. Then the next succeeding rows are laid out in a reverse pattern with a thirty inch row, then a thirty-eight inch row, then a thirty-two inch row, and then three additional rows thirty inches apart so that the thirty-eight inch rows will accommodate tractor wheels and the thirty-two inch rows will accommodate a downwardly extending spray on a spray boom used for spraying the celery and where rows are laid out in this manner, the cutter is so adjusted as to properly cut the rows and once the cutters are adjusted laterally of the boom on the tractor, continuous rounds of cutting operations can be carried out so that the cutters will exactly coincide with the rows of celery.

For many years celery was cut with a long knife or machette which was a very laborious operation. In later years, a hand tool has been devised comprising a wheeled frame having an inverted U-shaped bow with the wheels running on each side of a celery row and trailing behind this frame was a U-shaped cutter, and a strong man would push this wheeled frame along the celery row and by holding the cutting blade at a definite distance just beneath the top of the soil, the celery is cut. This is a very laborious operation and requires able bodied men with a premium price per day for this type of work. Furthermore, this cutting operation is never accurate, and sometimes the stalks are cut too low leaving a good many side roots on the celery stalk which requires further hand trimming and thus increasing the cost of harvesting the celery.

Furthermore, by this type of cutting celery whether it be by the machette or the hand pushed wheeled tool, if the celery were cut too near the top of the ground, it causes total destruction of the stalk of celery for marketing purpose as the outer branches of the celery are severed from the binding root and fall apart leaving exposed only the hearts of the celery which are not marketable in this mutilated condition.

After the celery is cut, a crew of strippers follow behind the cutting operation and remove the undesirable outer stalks and leaves and then pack it into a field box which has one of its sides and top open and a long machette is employed by a laborer who with one stroke severs the upper ends of the stalks and thus rids the celery stalk of the surplus foliage.

It is an object of this invention to provide a celery cutter comprising an elongated boom disposed transversely and pivotally secured to the rear end of a tractor and having a plurality of cutters thereon for cutting a plurality of rows of celery at the same time, said tractor sometimes being especially geared down so as to travel slowly to allow the operator or operators following behind to individually adjust the cutters to suit the conditions of each row.

It is another object of this invention to provide a celery cutter adapted to be attached to a tractor having a plurality of cutting blades thereon for cutting a plurality of rows of celery having means for turning the cut celery over on its side immediately after the stalks have been cut.

Some of the objects of the invention having been stated, other objects will appear as the description proceeds, when taken in connection with the accompanying drawings, in which:

Figure 1 is a rear elevation of the cutter showing it attached to the rear end of a tractor;

Figure 2 is an enlarged cross-sectional view taken along the line 2—2 in Figure 1, showing a modified form of mounting the cutting blades and showing the means for supporting and pivoting the boom disposed transversely of the tractor, the mechanism associated with the other wheel of the tractor being identical to that shown in Figure 2, but opposite-hand;

Figure 3 is an enlarged elevation taken along the line 3—3 in Figure 1, showing a modified form of mounting the cutting blades and showing the parts broken away, and omitting the top pipe of the boom;

Figure 4 is a vertical sectional view taken through the central portion of Figure 3, and omitting the clamping mechanism and square pipe associated therewith;

Figure 5 is a cross-sectional view taken along the line 5—5 in Figure 4;

Figure 6 is an enlarged side elevation, partly in section and taken along the line 6—6 in Figure 1;

Figure 7 is a cross-sectional view taken along the line 7—7 in Figure 6;

Figure 8 is a vertical sectional view partly in elevation, and taken along the line 8—8 in Figure 6.

Referring more specifically to the drawings, the numeral 10 indicates the rear axle housing of a tractor which has on each end thereof a gear housing 11 with suitable gearings therein meshing with suitable gearing, not shown, in a gear housing 12 which is integral with the gear housing 11 and in gear housing 12 is a suitable stub axle, not shown, which is driven by the axle 13 in axle housing 10 for propelling the wheels 14 of the tractor. Secured to the inner surface of each of the housings 12 is a bracket 15 which has fixed thereto a link 16, and a second link 17 is fixed to housing 11 and is joined as at 18 to the link 16. The upper ends of links 16 have bearing portions 19 in which a rod 20 is rotatably mounted. Each end of the rod 20 has a crank 21 thereon which is adapted to have its ends rotatably mounted in suitable cuffs 22 slidably disposed on rods 23, and a stop collar 24 limits upward movement of the collar 22. A compression spring 25 is disposed around each rod 25 below the collar 22, and is restricted in its downward movement by means of pin 26. The lower end of each of the rods 23 is loosely secured in a pair of plate members 30 which are fixed on a square pipe 31 extending across the rear portion of the tractor forming a part of a boom. An eyebolt 35 penetrates the upper portions of plates 30, and has adjustably secured therein one end of a link 36, the other end of the link being pivotally secured as at 37 in the link 16. Pivotally secured to the lower portion of bracket 15 is a link 38 which is also pivotally secured at its other end as at 39 to one of the plates 30.

Extending rearwardly from and fixedly secured to the rod 20 is an arm 45 which has welded thereto an upwardly extending portion 46 and in the upper end as at 47 is pivotally mounted a hand lever 48 which has a spring pressed pawl 49 adapted to engage notches 50 in an arcuate member 51 which is integral with a bar 52. The lower end of lever 48 is pivotally connected as at 53 to the rear end of bar 52. Bar 52 is connected to the hydraulic lifting and lowering mechanism of the tractor (not shown) so that by means of the hydraulic mechanism, and with the lever 48 set in a fixed position in one of the cavities 50, the mechanism can pivot on pivots at the rear ends of links 36 and 38 and pivots 35 and 39 to raise and lower the cutting mechanism.

The square pipe 31 has associated therewith an upper pipe 60, and a plurality of interconnecting pipes 61 extend between the pipes 31 and 60 and are welded thereto to rigidly secure the same together. The pipe 60 has also a pair of downwardly projecting members 62 whose lower ends are flattened and are penetrated by the eyebolts 35 in plate members 30 to act as additional securing means between the pipes 60 and 31.

Mounted on the pipe 31 is a plurality of clamps each comprising a pair of U bolts 65, a plate 66, to which is welded a right angular member 67, and a second right angular member 68 is adapted to be penetrated by the free ends of the U bolts 65 with suitable nuts placed on the free ends of the U bolts 65 for rigidly clamping the right angle members 67 and 68 around pipe 31 and also for rigidly clamping a vertically disposed squared pipe 70 in position relative to the pipe 31 as it is held rigidly against the plate 66. Slidably mounted within pipe 70 is a smaller squared pipe 71 which has pivotally secured thereto as at 72 a link 73, the upper ends of the link 73 being pivotally secured as at 74 to the intermediate portion of a hand lever 75 which is pivoted as at 76 to a forwardly projecting ear 77 which is integral with plate 78 which rises from one side of outer pipe 70 and has a segmental gear 80 into which the lower end of a pawl 81 is adapted to fit in one of the teeth of gear 80 for holding the lever 75 in adjusted position. It is evident that by the hydraulic mechanism and the draw bar 52, the position of the entire cutting mechanism relative to the ground can be adjusted, and then smaller individual adjustments can be made in each cutter by means of the levers 75 to suit the land conditions.

On the lower end of pipe 71, there is secured by any suitable means such as welding a washer 84 which limits upward movement of pipe 71 relative to pipe 70. Welded to the lower end of pipe 71 and to washer 84 is a shank 85. This shank extends rearwardly and downwardly and has a bolt 86 penetrating the same which secures to this shank 85, a cutting blade 88, which projects outwardly across a row of celery and is adapted to travel just beneath the top of the soil surrounding the celery. Bolt 85 also secures a turning vane or blade 87 which is adapted to engage the celery after it is cut, or while it is being cut and to push it forwardly and laterally to turn it over, so that all the stalks of celery in a row will fall in the same direction, and thus clear a way for the stripping crew to walk and also make it more easily seized and stripped by the stripping crew.

If desired, instead of connecting the blade 88 directly to the shank 85 on bolt 86, shank 85 can have welded thereto if desired a support 89 and to this support 89, the shank of blade 88 can be secured by means of a bolt 90 so as to permit the blade to be removed without removing the vane 87.

In an elongated boom such as that shown in the drawings and composed of pipes 31 and 60 and interconnecting pipes 61 and members 62 and plate 30 and eyebolts 35, there is a certain amount of resiliency. Some means have to be provided in case the lay of the land is such that it is higher at one end of the boom than at the other to prevent the cutters from cutting too deeply. Therefore, I have provided a ground wheel near each end of the boom which is adapted to limit the downward motion of one end of the boom when the other end of the boom might be travelling over ground which is somewhat higher than the ground at the other end of the boom. It sometimes happens that the spraying machinery and cultivating machinery which is drawn by a tractor, results in the tractor wheels sinking down in places where the ground is soft, and forming deep depressions for a short distance in the rows where the tractor wheels have passed, and thus the side ground wheels connected to the boom prevent the ends of the boom from getting too close to the ground, thus causing the cutters to cut the celery too deeply in the ground. These ground wheels are secured to the pipes 31 by an identical clamp to that described for the securing of the cutter mechanisms to the pipe 31. The ground wheel mounts each comprises a squared pipe 95 which is surrounded by a pair of U bolts 65 and has associated therewith a clamping mechanism identical to that previously described. The pipe 95 which is squared up to point 96 has welded on its upper end a round pipe 97 which is threaded to threadably receive a cap 98 and disposed within the squared pipe 95 is a smaller squared pipe 99 to the lower end of which is secured an outturned axle 100 on which is mounted a wheel 101 which is preferably of the pneumatic variety. The wheels 101 are adapted to travel in a furrow between or adjacent to the outer rows of the swath being cut by the cutting mechanism attached to the rear end of the tractor. The outer pipe 95 has a pair of slots 102 in opposed walls in which is slidably mounted a pin 103 which penetrates the inner squared pipe 99 and allows vertical movement of the inner pipe 99 relative to the outer pipe 95. Resting on the upper end of inner pipe 99 is a compression spring 105 of desired rigidity which is engaged by a plug 106 disposed inside the cap 98 and by screwing or unscrewing the cap 98 on the threaded portion of pipe 97, the amount of downward stress exerted on the wheel 101 is regulated. The slots 102 and pin 103 prevent the inner pipe 99 from dropping out of the outer pipe 95 when the mechanism is raised to transport position. The resiliency thus additionally imparted to the resilient wheel 101 allows this wheel to move upwardly relative to the boom 95 when a high place in the ground is encountered without unduly straining the boom mechanism, and it also automatically regulates the cutting depth of the cutters disposed on each end of the boom.

In the drawings the stalks of celery are indicated by reference character 104, and although I have described and shown this cutting mechanism as being especially adaptable for the cutting of celery, it is evident that it could be used for cutting other forms of vegetation.

In the drawings and specification, there has been set forth a preferred embodiment of the invention, and although specific terms are employed, they are used in a generic and descriptive sense only, and not for the purposes of limitation, the scope of the invention being defined in the claims.

I claim:

1. In a celery cutter, a boom disposed transversely of a tractor, means pivotally mounting the boom on the tractor, means for moving the boom upwardly on the pivots for lifting the same to inoperative position, or for lowering the same to operative position, a plurality of vertically adjustable cutters disposed on said boom, there being a cutter for each row of celery, a lever and segmental gear for individually adjusting each of the cutters vertically relative to said boom, means connected to a power driven element on the tractor for raising and lowering the boom together with the cutters carried thereby, and vertically adjustable and resiliently mounted ground engaging means mounted on the boom adjacent each end thereof for regulating the position of each end of the boom relative to the ground over which the tractor is traveling.

2. In combination, a tractor, a pair of links pivoted at one end to the tractor, a boom comprising a plurality of transversely disposed members secured to each other in superposed relation and pivotally secured at the other ends of said links, a rotatable rod mounted on the tractor and having a crank at each end thereof, a pair of upwardly projecting rods pivotally secured at their lower ends to the boom, and spring-pressed means on an intermediate portion of the rods pivotally secured to the crank members, means connected to the tractor for oscillating the rod having the cranks thereon for raising and lowering the boom, a plurality of vertically slidable members mounted on said boom and disposed in spaced relation transversely of the boom, a shank disposed on the lower portion of each vertically slidable member and having a transversely projecting blade secured thereto and adapted to extend across a row of celery for cutting the celery, a lever and segmental gear for individually adjusting each cutter vertically of the boom to regulate the depth at which the celery is cut and to exert a downward positive pressure on the blade, and a ground wheel resiliently mounted near each end of the boom.

3. Apparatus for cutting celery comprising a framework disposed transversely of the tractor, said tractor having a lifting bar adapted to be moved by a suitable lifting mechanism of the tractor, a pair of links disposed at different elevations and having one of their ends pivotally connected to the tractor and having their outer ends pivotally connected at different elevations to the framework, means connecting the lifting bar of the tractor to the framework for raising and lowering the framework by swinging the same on its pivots, a plurality of vertically disposed pipes secured on the framework, a plurality of substantially vertically disposed members slidably mounted in the pipes and having a transversely extending cutter blade thereon for cutting the celery plants immediately below the top surface of the soil in which they are growing, a segmental gear on the upper end of each pipe and a lever pivotally mounted thereon and connected to the vertically slidable members, said lever having a pawl for engaging said segmental gear for holding the vertically slidable member in adjusted position.

4. In a celery cutting mechanism adapted to be secured to and drawn by a tractor, said tractor having a lifting bar adapted to be moved by a suitable lift mechanism of the tractor, a framework comprising upper and lower pipes extending transversely of the tractor, a plurality of vertically disposed pipes secured on the framework, each of said pipes having a vertically slidable member therein and provided with a laterally and rearwardly extending blade on its lower end for cutting the celery immediately below the top of the ground, a segmental gear secured on the upper end of each vertically disposed pipe, a lever pivoted intermediate its ends on the gear and having one of its ends pivotally connected to the vertically slidable member, said lever having a pawl for engaging said gear to hold its vertically slidable member and its blade in adjusted position, means for pivotally securing the framework to the tractor comprising a pair of links associated with each side of the tractor and having their front ends pivotally secured to the tractor frame one above the other, and having their rear ends pivotally secured to the framework one above the other, crank means for raising and lowering the framework on its pivots, means connecting the crank means with the lifting bar of the tractor for raising and lowering the framework on its pivots, the pivots being so disposed as to cause the vertically disposed members on the framework to occupy a substantially vertical position regardless of the elevation of the framework relative to the ground over which the tractor is traveling.

5. A celery cutter comprising a wheeled frame, a boom extending transversely of the wheeled frame, said boom comprising upper and lower members joined together by connecting members, a plurality of pipes secured in vetrical position on the boom and spaced from each other, each of said pipes having a member slidably mounted therein, a segmental gear and lever connecting each slidable member to its associated pipe for vertical adjustment of the slidable member relative to its pipe and to exert a positive downward push on the slidably mounted member, the lower end of each slidable member having one end of a downwardly laterally and rearwardly projecting cutting blade connected thereto, means for raising and lowering the boom relative to the wheeled frame, and a resiliently mounted ground wheel secured near each end of the boom.

THOMAS J. BELL.